United States Patent [19]

Knowles

[11] Patent Number: 4,934,498

[45] Date of Patent: Jun. 19, 1990

[54] DRIVE ENGAGEMENT DELAY DEVICE

[76] Inventor: Arthur Knowles, 24 Carter La. W., South Normanton, Derbyshire DE55 2DX, England

[21] Appl. No.: 329,411

[22] Filed: Mar. 24, 1989

[51] Int. Cl.$^5$ .................. F16D 13/22; F16D 23/06
[52] U.S. Cl. .................. 192/18 A; 192/53 F; 192/67 A; 192/111 B
[58] Field of Search .......... 192/18 A, 53 B, 53 E, 192/53 F, 67 A, 58 C, 111 B

[56] References Cited

U.S. PATENT DOCUMENTS

| | | | |
|---|---|---|---|
| 1,730,362 | 10/1929 | Gaylord | 192/53 G |
| 2,397,943 | 4/1946 | Bull | 192/53 F |
| 3,161,270 | 12/1964 | Aschauer | 192/53 B |
| 3,860,101 | 1/1975 | De Feo et al. | 192/53 G |
| 3,872,954 | 3/1975 | Nordstrom et al. | 192/18 A |

Primary Examiner—Rodney H. Bonck
Assistant Examiner—Andrea Pitts
Attorney, Agent, or Firm—Larson and Taylor

[57] ABSTRACT

A drive arrangement including an axially movable driving sleeve capable of being positively engaged to an output shaft connected to a driven element, the drive arrangement having a drive engagement delay device including a plurality of friction plates, the friction drive being sufficient to turn the output shaft but the frictional engagement of at least one of the friction plates with the longitudinal slide surfaces of the driving sleeve temporarily preventing its further movement.

7 Claims, 2 Drawing Sheets

DRIVE ENGAGEMENT DELAY DEVICE

FIELD OF THE INVENTION

The invention relates to a drive engagement delay device.

There are various instances where the engagement of a drive to an item of machinery results in shock loading due to the inertia of the machinery to be driven. For example, the drive to the impellor of the centrifugal pump of a fire engine is generally effected by the sliding of an internally splined driving sleeve into driving engagement with a splined driving member drivably connected to the impellor, the driving sleeve being permanently connected to a gear driven by a power take off shaft of the vehicle engine. The driving sleeve is generally moved by power means including a pneumatic ram between its operative and inoperative positions. It is found that the inertia of the impellor causes shock loading in the drive to the impellor at the instant in which the driving sleeve is moved to its operative position, this putting undue stress on all of the various elements in the drive train to the impellor and being generally unpleasant for those who are operating the engine. The invention has for its object to provide a drive engagement delay device by means of which this problem can be at least alleviated.

SUMMARY OF THE INVENTION.

According to the invention, there is provided a drive arrangement including an engageable and disengageable drive constituted by an axially movable driving sleeve capable of being positively engaged either by a splined connection or a dog toothed clutch connection to an output shaft connected to a driven element, the drive arrangement having a delay device for at least reducing shock loading as the positive connection is established, said delay device including a plurality of friction plates for producing a friction drive to the output shaft as the driving sleeve is moved towards its positively engaged position, the friction drive being sufficient to turn the output shaft but the frictional engagement of at least one of the friction plates with longitudinal slide surfaces of the driving sleeve preventing further movement of said sleeve towards its positively engaged position until the inertia of the output shaft and the connected driven element has been overcome and the frictional resistance to sliding movement of the driving sleeve has become correspondingly reduced. The light loading of the stack of friction plates by the initial movement of the driving sleeve towards its operative position may be effected by a pressure plate acting against an endmost friction plate, said pressure plate being slidably splined within the driving sleeve but provided with a plurality of steel balls which are located in respective radial bores in said pressure plate and urged radially outwards by respective springs, the steel balls in their radially outermost positions engaging shallow depressions formed at the radially inner surfaces of the splines of the driving sleeve, the number of said balls, the strength of the springs urging them radially outwards and the depth of the depressions engaged by said balls, in combination, ensuring that only a predetermined maximum axial thrust can be applied to the pressure plate by the driving sleeve, this being a pressure sufficient to engage the stack of friction plates adequately to produce the contact pressures acting against the side surfaces of the splines and temporarily arresting the movement of the driving sleeve towards its positively engaged position. Means will preferably be provided for giving added impetus to the driving sleeve as it resumes its sliding movement towards its positively engaged position, said means conveniently being constituted by a series of steel balls which are located in respective radial bores in a splined driving member with which the driving sleeve is permanently engaged, said steel balls being acted on by respective springs and being able to react against the ends of undercut slots in the splines of the driving sleeve to produce an axial force on said driving sleeve. An adjustment device will preferably be provided for finely adjusting the initially arrested position of the driving sleeve so that this is just before the position in which the sleeve is given added impetus as it resumes its sliding movement towards its positively engaged position. Such an adjustment device may include a plurality of adjustment screws conical ends of which act against a frusto-conical portion of a reaction plate acted on by the plurality of friction plates, the adjustment of the screws effecting the axial location of the reaction plate.

The driving sleeve will preferably be movable by power means between its operative and inoperative positions and back again, such power means conveniently being constituted by a pneumatic ram built into a housing in which the drive arrangement is located, an actuating rod of the pneumatic ram carrying a fork member the fingers of which engage an annular groove formed around the driving sleeve. Braking means may be provided whereby, simultaneously with the driving sleeve being moved out of engagement with the clutch connection to the output shaft, the latter is braked to bring it to a halt and to hold it against free rotation. Such braking means may be constituted by a piston an end portion of which is able to act frictionally against an adjacent surface of a driving member, the arrangement being such that, when air under pressure is admitted to a space so that the actuating rod of the pneumatic ram is moved to displace the driving sleeve away from its positively engaged position, the air under pressure is able to communicate with a cylinder in which said piston is slidable against the force of a return spring.

DESCRIPTION OF THE PREFERRED EMBODIMENT.

Figure 1:
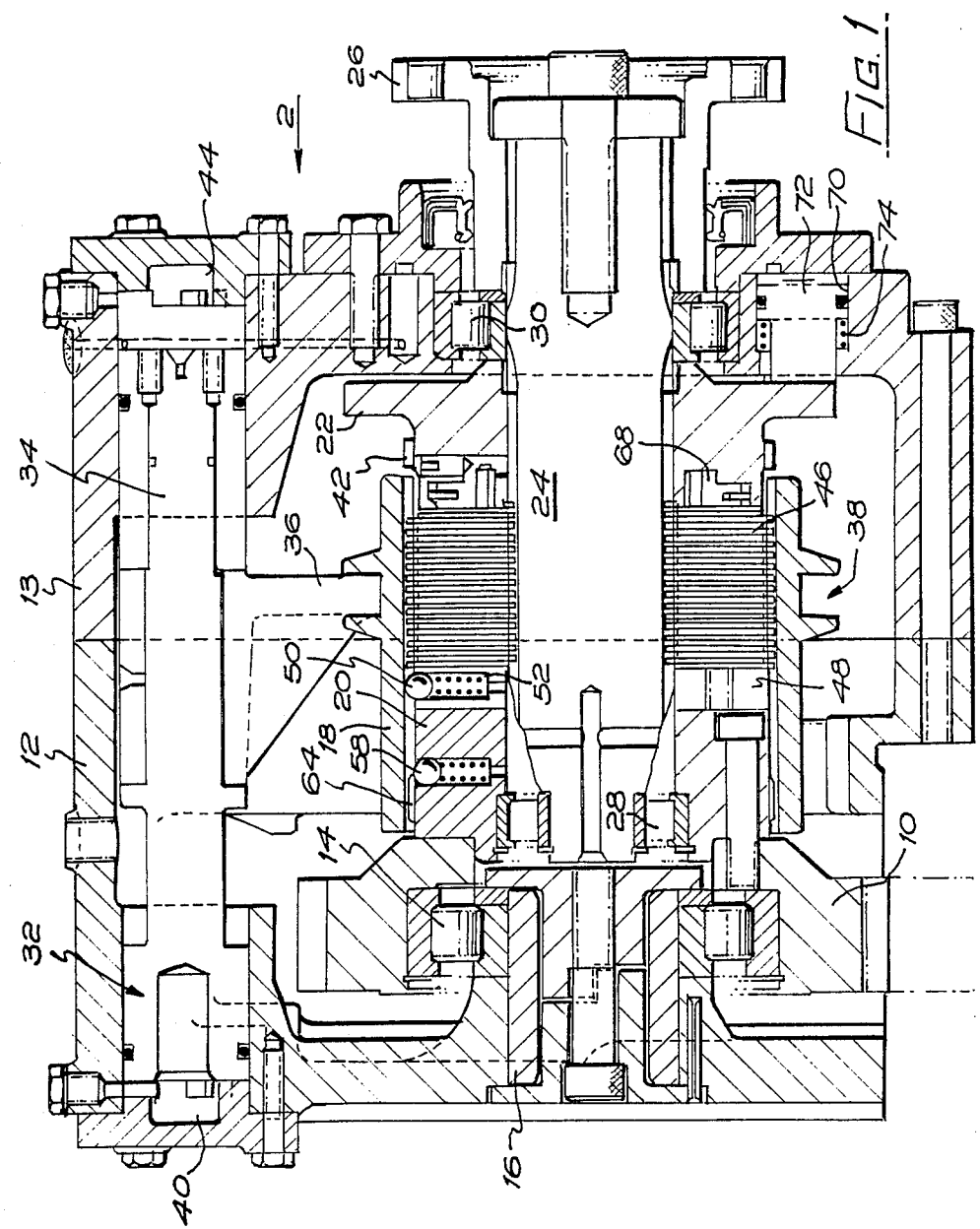
FIG. 1 is a longitudinal section through an auxiliary drive arrangement to the pump of a fire engine.

Referring now in particular to FIG. 1 of the drawings, the auxiliary drive arrangement there illustrated includes a gear 10 mounted for rotation in a housing formed in two parts 12 and 13. The gear 10 is shown to be located so that when the housing is bolted in position on an engine block (not shown) the gear meshes with an engine driven gear a portion of which is shown in chain-dotted lines. Thus it will be understood that the gear 10 is constantly rotating whenever the engine is running. As shown, the gear 10 is freely rotatable on a roller bearing 14, the latter being located on a stub shaft constituted by a sleeve member 16 located in an end wall of the housing. The drive arrangement also includes an internally splined driving sleeve 18 permanently in engagement with an externally splined extension 20 of the gear 10. The driving sleeve is slidably mounted so that it can be moved into driving engagement with a splined driving member 22 drivably connected to an output shaft 24, the latter being provided with a coupling member 26 by means of which it can be connected to the impellor (not shown) of a centrifugal pump. An inner end of the output shaft 24 is located by a roller bearing 28 within the splined extension 20 of the gear 10. The output shaft is also located in an end wall of the housing by a roller bearing 30.

The driving sleeve 18 is movable by power means between its operative and inoperative positions and back again, that is to say is displaced as required by a pneumatic ram generally indicated 32 built into the housing as shown. The actuating rod 34 of the pneumatic ram carries a fork member 36 the fingers of which engage an annular groove 38 formed around the driving sleeve. The arrangement is such that when air under pressure is admitted to a space 40 at one end of the actuating rod, the latter is moved to the right as the mechanism is shown in FIG. 1, to displace the driving sleeve 18 from the position in which it is shown and to engage it with the splines 42 of the driving member 22 so that a positive drive is transmitted to the output shaft. When drive to the output shaft is to be discontinued, air under pressure is admitted to a space 44 at the other end of the actuating rod so that the latter is moved to the left and the driving sleeve is moved out of engagement with the splines 42.

However, a delay device is built into the arrangement so that shock loading in the drive as the driving sleeve is engaged with the splines 42 is avoided. The delay device is constituted by a stack of friction plates, generally indicated 46, alternate ones of which are engaged with the splines within the driving sleeve and the remainder of which have splined engagement with the output shaft. The arrangement is such that an initial movement of the driving sleeve towards the right (as the mechanism is shown in FIG. 1) lightly loads the stack of friction plates together sufficiently to start turning the output shaft. Relatively high torque is required to turn the output shaft initially because of the inertia of the pump impellor to which it is connected. Consequently, the relatively high contact pressures acting against the side surfaces of the splines of the driving sleeve prevent any further displacement of the sleeve at this time until the initially high torque being transmitted has become substantially reduced, that is to say until the output shaft has started to turn, although still not rotating at the speed of rotation of the driving sleeve. When the torque being transmitted frictionally has fallen sufficiently, the driving sleeve is able to slide relative to the friction plates which it engages and to complete its movement into engagement with the splines 42 of the driving member 22 so that a positive drive is established.

Figure 3:
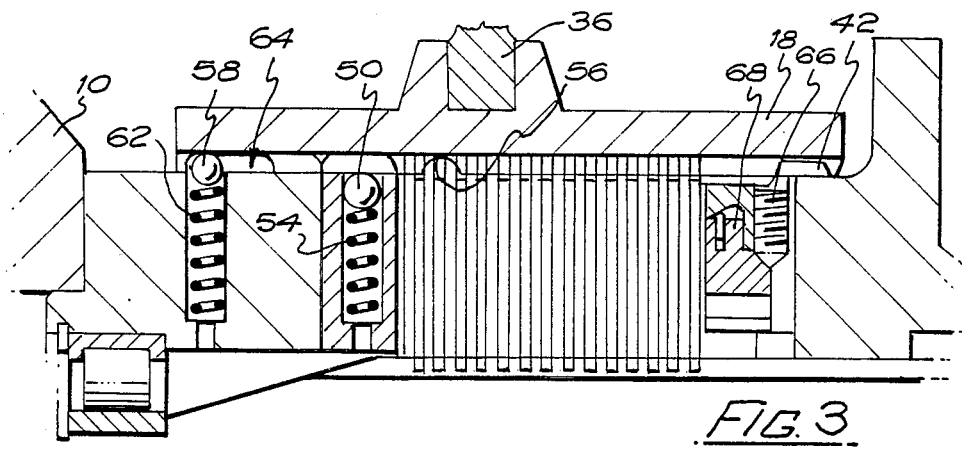
FIG. 3 is a scrap view of a part of the mechanism illustrated in FIG. 1, shown here in a different position and at a somewhat larger scale.

The light loading of the stack of friction plates by the initial movement of the driving sleeve towards its operative position is effected by a pressure plate 48 which, as shown, is located between the externally splined extension 20 of the gear 10 and an endmost friction plate. Said pressure plate is slidably splined within the driving sleeve but is provided with a plurality of steel balls 50 which are located in respective radial bores 52 and urged radially outwards by respective compression springs 54. In their radially outermost positions (see FIG. 1) the steel balls 50 engage shallow depressions 56 which are formed at the radially inner surfaces of the splines of the driving sleeve. The number of said balls, the strength of the springs 54 and the depth of the shallow depressions 56, in combination, ensure that only a pre-determined maximum axial thrust can be applied to the pressure plate by the driving sleeve, this being a pressure sufficient to engage the stack of friction plates adequately to produce the contact pressures acting against the side surfaces of the splines, and this in turn temporarily arresting the movement of the driving sleeve towards the splines 42 as previously explained. However, when the torque being transmitted frictionally through the stack of friction plates has fallen sufficiently to allow the driving sleeve to be further displaced along the splines of those plates which it engages, the pressure of air still present within the space 40 overcomes the force of the springs 54 and displaces the steel balls 50 radially inwards. The driving sleeve is thus able to move again towards the operative position in which it is shown in FIG. 3. As the driving sleeve resumes its movement, it is given added impetus to fully engage its splines with the splines 42 of the driving member 22 by the action of a further series of steel balls 58 located in respective radial bores 60 in the splined extension of the gear 10. The steel balls 58, being acted on by respective compression springs 62, react against the ends of undercut slots 64 in the splines of the driving sleeve to produce an axial force on said driving sleeve. It will be seen from Figure that this can occur immediately after the sleeve resumes its movement from the position in which is there shown and at the instant in which the right hand end of the sleeve makes contact with the splines 42.

An adjustment device is provided for finely adjusting the initially arrested position of the driving sleeve so that this is just before the position in which the sleeve is given added impetus by the action of the steel balls 58. This adjustment device includes three equally spaced adjustment screws 66 conical end portions of which can act against a frusto-conical portion of a reaction plate 68 acted on by the plurality of friction plates. The adjustment of the screws 66 effects the axial location of the reaction plate.

Figure 2:
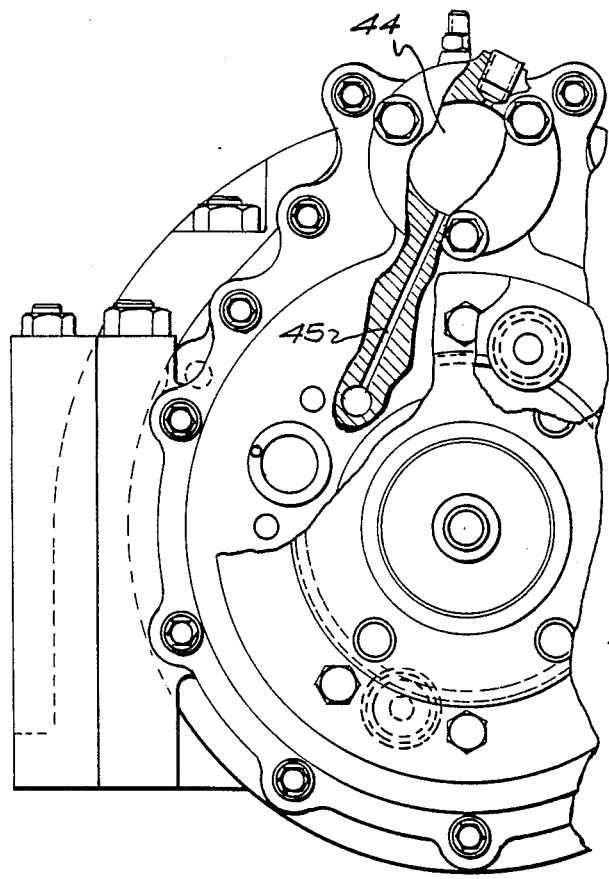
FIG. 2 is a scrap view on one end of the arrangement, looking in the direction of arrow 2 in FIG. 1.

The drive arrangement just described has a further advantageous feature, this being that simultaneously with the driving sleeve being moved out of engagement with the splines 42 of the driving member 22, the latter is braked to bring the output shaft to a halt and to hold it against free rotation. This is brought about by the fact that when air under pressure is admitted to the space 44 so that the actuating rod 34 is moved to the left (as drawn in FIG. 1) the air under pressure is able to communicate, via a drilling 45 (see FIG. 2), with a cylinder 70 machined in the end wall of the housing part 13. The cylinder 70 contains a piston 72 and the arrangement is such that the pressure of air admitted to the cylinder is effective to displace the piston against the force of a return spring 74 so that a protruding end portion of said piston is caused to act frictionally against an adjacent surface of the driving member 22.

Thus there is provided a drive engagement delay device which it is thought will be a complete answer to the problem of shock loading when an item having considerable inertia is to be driven by a splined sleeve or dog tooth clutch arrangement. It will be understood that the invention is applicable to a wide range of drive arrangements in which this might be a problem. The drive to the impellor of a centrifugal pump for a fire engine is merely a typical example of such an arrangement.

Various modifications may be made. For example, it will be understood that the positive driving connection between the driving sleeve and the driving member 22 need not necessarily be constituted by the splines 42. It could equally well be constituted by a dog tooth clutch arrangement, that is to say an arrangement in which the teeth are formed on the opposed end faces of the parts to be connected together. Furthermore, the adjustment device for finely adjusting the initially arrested position of the driving sleeve may be rather differently arranged. For example, it may include a screwthreaded ring carried by the reaction plate, that is to say engaging a screwthreaded portion of said plate, and according to the adjustment of said ring on the reaction plate adjusting the effective thickness of the latter, locking means being provided for locking said ring in an adjusted position.

What I claim and desire to secure by Letters Patent is:

1. A drive arrangement including an engageable and disengageable drive constituted by an axially movable driving sleeve capable of being positively engaged with an output shaft connected to a driven element, the drive arrangement having a drive engagement delay device for at least reducing shock loading as the positive connection is established, said delay device including a plurality of friction plates for producing a friction drive to the output shaft as the driving sleeve is moved towards its positively engaged position, the friction drive being sufficient to turn the output shaft but the frictional engagement of at least one of the friction plates with longitudinal slide surfaces of the driving sleeve preventing further movement of said sleeve towards its positively engaged position until the inertia of the output shaft and the connected driven element has been overcome and the frictional resistance to sliding movement of the driving sleeve has become correspondingly reduced the light loading of the stack of friction plates by the initial movement of the driving sleeve towards its operative position being effected by a pressure plate acting against an endmost friction plate, said pressure plate being slidably splined within the driving sleeve but provided with a plurality of steel balls which are located in respective radial bores in said pressure plate and urged radially outwards by respective springs, the steel balls in their radially outermost positions engaging shallow depressions formed at the radially inner surfaces of the splines of the driving sleeve, the number of said balls, the strength of the springs urging the balls radially outwards and the depth of the depressions engaged by said balls, in combination, ensuring that only a pre-determined maximum axial thrust can be applied to the pressure plate by the driving sleeve, this being a pressure sufficient to engage the stack of friction plates adequately to produce the contact pressures acting against the side surface of the splines and temporarily arresting the movement of the driving sleeve towards it positively engaged position.

2. A drive arrangement including an engageable and disengageable drive constituted by an axially movable driving sleeve capable of being positively engaged with an output shaft connected to a driven element, the drive arrangement having a drive engagement delay device for at least reducing shock loading as the positive connection is established, said delay device including a plurality of friction plates for producing a friction drive to the output shaft as the driving sleeve is moved towards its positively engaged position, the friction drive being sufficient to turn the output shaft but the frictional engagement of at least one of the friction plates with longitudinal slide surfaces of the driving sleeve preventing further movement of said sleeve towards its positively engaged position until the inertia of the output shaft and the connected driven element has been overcome and the frictional resistance to sliding movement of the driving sleeve has become correspondingly reduced, means being provided for giving added impetus to the driving sleeve as said sleeve resumes its sliding movement towards its positively engaged position, said means being constituted by a series of steel balls which are located in respective radial bores in a splined driving member with which the driving sleeve is permanently engaged, said steel balls being acted on by respective springs and being able to react against the ends of undercut slots in the splines of the driving sleeve to produce an axial force on said driving sleeve.

3. A drive arrangement according to claim 2, in which an adjustment device is provided for finely adjusting the initially arrested position of the driving sleeve so that this is just before the position in which the sleeve is given added impetus as it resumes its sliding movement towards its positively engaged position.

4. A drive arrangement according to claim 3, in which the adjustment device includes a plurality of adjustment screws conical end portions of which act against a frusto-conical portion of a reaction plate acted on by the plurality of friction plates, the adjustment of the screws effecting the axial location of the reaction plate.

5. A drive arrangement including an engageable and disengageable drive constituted by an axially movable driving sleeve capable of being positively engaged with an output shaft connected to a driven element, the drive arrangement having a drive engagement delay device for at least reducing shock loading as the positive connection is established, said delay device including a plurality of friction plates for producing a friction drive to the output shaft as the driving sleeve is moved towards its positively engaged position, the friction drive being sufficient to turn the output shaft but the frictional engagement of at least one of the friction plates with longitudinal slide surfaces of the driving sleeve preventing further movement of said sleeve towards its positively engaged position until the inertia of the output shaft and the connected driven element has been overcome and the frictional resistance to sliding movement of the driving sleeve has become correspondingly reduced, the driving sleeve being movable by power means between its operative and inoperative positions and back again, the power means being constituted by a pneumatic ram built into a housing in which the drive arrangement is located, an actuating rod of the pneumatic ram carrying a fork member the fingers of which engage an annular groove formed around the driving sleeve.

6. A drive arrangement according to claim 5, in which braking means are provided whereby, simultaneously with the driving sleeve being moved out of engagement with the clutch connection to the output shaft, the latter is braked to bring it to a halt and to hold it against free rotation.

7. A drive arrangement according to claim 5, in which braking means are provided whereby, simultaneously with the driving sleeve being moved out of engagement with the clutch connection to the output shaft, the latter is braked to bring it to a halt and to hold it against free rotation, the braking means being constituted by a piston an end portion of which is able to act frictionally against an adjacent surface of a driving member, the arrangement being such that, when air under pressure is admitted to a space so that the actuating rod of the pneumatic ram is moved to displace the driving sleeve away from its positively engaged position, the air under pressure is able to communicate with a cylinder in which said piston is slidable against the force of a return spring.

* * * * *